2,978,063
SYSTEM FOR RECOVERY OF VALUABLE CONSTITUENTS FROM NORMALLY WASTED MATERIALS

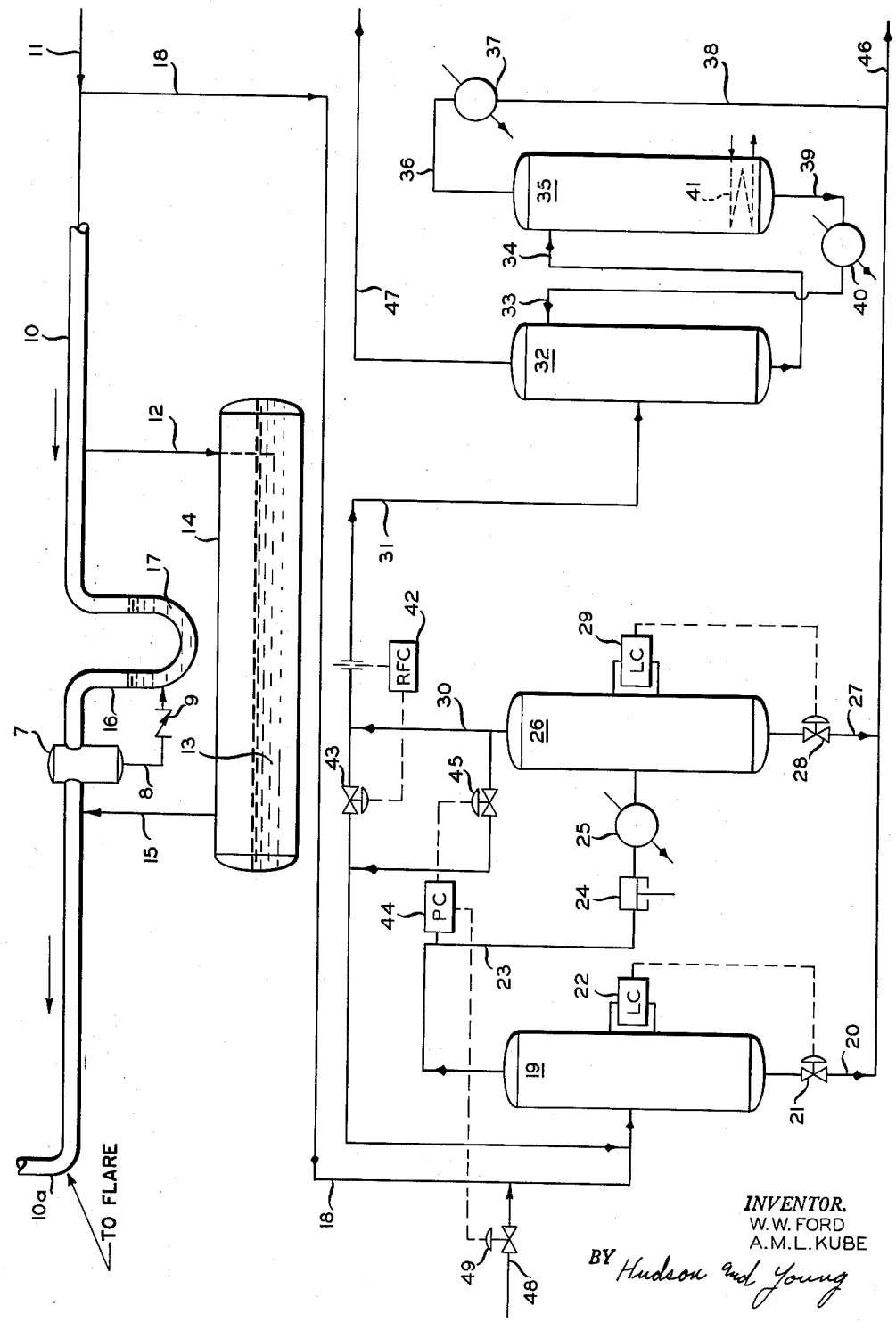

William W. Ford and Adolph M. L. Kube, Phillips, Tex., assignors to Phillips Petroleum Company, a corporation of Delaware Filed Apr. 6, 1959, Ser. No. 804,399

5 Claims. (Cl. 183—2)

This invention relates to a system for the recovery of valuable constituents in gases normally sent to the flare line. In plants for the separation and processing of hydrocarbons such as refineries, gasoline plants, petrochemical plants, and the like, large quantities of gases are sent to a flare as a result of upset conditions in portions of the plant or by leakage of high pressure gases through safety valves into the flare line system. It has been proposed to return such gases resulting from leakage to a low pressure point in the system and to provide a liquid trap in the flare line to prevent venting of gases to the flare line under normal operating conditions. The gases in a flare line system usually represent a heterogeneous mixture of gases as a result of their having originated from a variety of sources and it is not always desirable to introduce such mixture to a low pressure point in the system. Furthermore, a liquid trap has not always proven successful because a water trap has a tendency to freeze during unexpected cold weather and an oil trap has a tendency to accumulate condensable hydrocarbon materials within itself and to pass lugs of liquid to the flare as a result of such increase in volume through condensation of liquefied material.

In accordance with this invention, provision is made for the absorption of condensable materials from the gases being passed to the flare line, for further processing and reuse and for passing the noncondensable gases to the fuel line to be used for supplying heat to the plant under consideration. Further, in accordance with this invention, provision is made for a water trap in the line to the flare to prevent venting of gases during normal operation and a by-pass line to carry materials going to the flare through an oil trap maintained at a slightly higher pressure than that of the water trap so that a substantially uninterrupted flow to the flare is assured at all times when a flow of large volume to the flare is required.

It is an object of this invention to provide a system for separating the condensable materials present in a flare line from the noncondensable materials, sending the noncondensable materials to be used as fuel and processing the condensable materials for further use. It is also an object of this invention to provide two dissimilar liquid traps in the flare line connected in parallel so that substantially uninterrupted flow to the flare is accomplished under all conditions of operation. It is still another object of this invention to provide a compression system and an absorption system for treating the materails in the flare line system wherein the minimum pressure on the compression system is controlled and the maximum flow rate to the absorption system is controlled. Other and further objects and advantages of this invention will be apparent to one skilled in the art upon study of this disclosure including the detailed description of the invention and the attached drawing.

The accompanying drawing illustrates a schematic diagram of an apparatus constructed in accordance with the invention.

Referring now to the drawing, gases enter the flare line 10 from a gathering system (not shown), via conduit 11 and pass through an induction line 12 to beneath the surface of the liquid 13 in tank 14 so as to produce a pressure of 2 or 3 pounds in flare line 10. Gases which escape through the liquid trap in tank 14 pass through line 15 to the flare via conduit 10a. Liquid trap 16 is positioned in flare line 10 and is connected in parallel with the liquid trap of tank 14 and contains liquid 17. The liquid head in trap 16 will normally be maintained at a level to produce a pressure 2 or 3 pounds higher than that produced by the liquid head in tank 14. A scrubber 7 can be placed in conduit 10 downstream from liquid trap 16 to recover liquid blown from trap 16 by a surge of high pressure in flare conduit 10. The liquid is returned to trap 16 via conduit 8 containing check valve 9 if scrubber 7 is elevated sufficiently for gravity flow. Check valve 9 can be replaced by a pump (not shown) if scrubber 7 is not elevated sufficiently for gravity flow.

A branch line 18 conducts gas from flare line 10 to a first liquid-gas separator 19 where any liquid which is present in the gas accumulates in vessel 19 and is removed by means of conduit 20 through motor valve 21, which is actuated by liquid level control 22. Gases removed from vessel 19 via conduti 23 are compressed by compressor 24, cooled by cooler 25 and passed into a second liquid-gas separator 26. Liquid is removed from vessel 26 via conduit 27 through motor valve 28 which is controlled by liquid level control 29. Gas from vessel 26 passes through conduits 30, 31 to absorber 32 where it is contacted with a liquid absorbent introduced via conduit 33. The rich absorbent passes from absorber 32 through conduit 34 to stripper 35 from whence desorbed materials are removed via conduit 36, cooled in cooler 37 and removed via conduit 38. The lean solvent or absorbent is removed from stripper 35 via conduit 39, is cooled in cooler 40 and returned to absorber 32 via conduit 33. Heat is added to stripping vessel 35 by means of a heater 41, which can be any conventional heating means such as steam, electricity and the like.

A recording flow controller 42 operatively connected to conduit 31 actuates a normally open motor valve 43 so as to limit the flow to absorber 32 to a predetermined maximum value.

A pressure controller 44 operatively connected to conduit 23 actuates a normally closed motor valve 45 so as to open said valve when a pressure in conduit 23 falls below a predetermined value so as to recycle compressed gas back to the compressor inlet at times when the pressure in the flare line system is abnormally low. The condensed materials recovered from vessels 19, 26 and 35 are removed via a common conduit 46. Noncondensed gases are passed to a fuel supply system via conduit 47.

Positive control of compressor suction pressure can be obtained by supplying make-up fuel gas from an outside source via conduit 48. If fuel gas is supplied via conduit 48, pressure controller 44 will actuate normally closed motor valve 49 instead of, or in addition to, motor valve 45.

The water level in vessel 14 can be maintained by conventional means such as a water inlet valve operated by a liquid level control means. Heating means can be supplied to heat the water in vessel 14 during cold weather if such is desired.

The head of water in vessel 14 is selected so that a back pressure of from about 1 to about 3 pounds per square inch gauge is maintained in the flare system 10 and the liquid head maintained in liquid trap 16 is usually about 1 to 2 pounds higher than that of the liquid trap of vessel 14. The gas in the conduit 31 is compressed to some preselected value such as about 68 p.s.i.g. and the recording flow controller 42 is set at a preselected value for example about 3 mm. standard cubic feet per day. The pressure controller 44 is set to open valve 45 at some predetermined minimum pressure in conduit 23 for example about ½ p.s.i.g.

From the above, it can be seen that all of the non-condensable gases which enter the flare line system are used for fuel under normal operation and that the condensable materials are recovered for further processing. When gases pass into the flare line system at an abnormally high rate, the excess over that which can be used as fuel is passed to the flare. By the practice of this invention, the flare line is always capable of passing large quantities of gas at relatively low pressure and at the same time reverse flow of gas through the flare line is substantially completely prevented.

If desired, the pressure controller 44 can be operatively connected to a means for shutting down the compressor 24 if the pressure in conduit 23 falls to a predetermined low value which might result in harm to the compressor. Thus, the pressure controller 44 can be caused to actuate a switch which opens the operating electrical circuit to the motor operating compressor 24 if an electric motor is used, or can be caused to close a valve in a steam line if steam power is used to operate the compressor.

Reasonable variations and modifications are possible within the scope of the present disclosure without departing from the spirit and scope of the invention.

That which is claimed is:

1. A system for recovery of valuable constituents from gases sent to a flare which comprises, in combination, a flare conduit connected to a flare and to a source of gases; a first liquid seal containing water as the sealing liquid operatively connected to said flare conduit so as to pass gas to said flare when a predetermined first pressure is attained in said flare conduit; a second liquid seal containing oil as the sealing liquid operatively connected to said flare conduit so as to pass additional gas to said flare when a predetermined higher second pressure is attained in said flare conduit; means to collect oil blown from said second seal and to return same to said second seal; a first gas-liquid separator; conduit means connecting said first separator to said flare conduit at a point upstream from said first liquid seal; a second gas-liquid separator; means to remove gas from said first separator, to compress and cool said gas and pass same to said second separator; means to remove liquid from said separators; absorber means containing an absorbent to absorb selected components from a gas; means to pass gas from said second separator to said absorber when the pressure in said flare conduit is above a predetermined value; means to pass gas from said second separator to said first separator when the gas pressure in said flare conduit is below said predetermined value; stripper means to remove absorbed components from said absorbent; means to pass absorbent containing said components from said absorber to said stripper; means to remove gas, freed of said components, from said absorber; means to pass absorbent freed of said components from said stripper to said absorber; and means to remove said components from said stripper.

2. A system for recovery of valuable constituents from hydrocarbons sent to a flare which comprises, in combination, a flare; a flare conduit; a plurality of liquid seals connected to said flare conduit in parallel so as to pass an increasing volume of hydrocarbons to said flare at increasing increments of pressure in said flare conduit; separator means for separating liquids and readily condensable gases from hydrocarbons; means for passing hydrocarbons to said separator means from said flare conduit at a point upstream from said seals; means for removing liquid from said separator means; absorber means for removing valuable constituents from a gas; means for passing gas from said separator means to said absorber means; means for recovering gas from said absorber means; and means for recovering valuable constituents from said absorber means.

3. A system for recovering fuel gas and condensable hydrocarbons from normally wasted hydrocarbons sent to a flare which comprises, in combination, a flare; a flare conduit; liquid seals operatively connected to said flare conduit in parallel so as to maintain a predetermined minimum pressure in said flare conduit and to pass increasing amounts of hydrocarbons to said flare at increasing increments of pressure in said flare conduit; means for removing hydrocarbons from said flare conduit at a point upstream from said seals; means for recovering liquid from the removed hydrocarbons; means for condensing and recovering condensable hydrocarbons from remaining removed hydrocarbons; and means for recovering remaining fuel gas from said condensing means.

4. A system for recovery of condensable constituents from hydrocarbons sent to a flare which comprises, in combination, a flare; a flare conduit; a plurality of liquid seals connected to said flare conduit in parallel so as to pass an increasing volume of hydrocarbon gases to said flare at increments of pressure in said flare conduit; a first gas-liquid separator; conduit means connecting said first separator to said flare conduit at a point upstream from said liquid seals; a second gas-liquid separator; means to remove gas from said first separator, to compress and cool said gas and pass same to said second separator; means to recover liquid from said separators as said condensable constituents; means to pass gas from second separator to said first separator when the pressure in said flare conduit is below a predetermined minimum; and means to pass gas from said second separator to a fuel gas supply means when the pressure in said flare conduit is above said predetermined minimum.

5. A system for recovery of condensable constituents from hydrocarbons sent to a flare which comprises, in combination, a flare; a flare conduit; a plurality of liquid seals connected to said flare conduit in parallel so as to pass an increasing volume of hydrocarbon gases to said flare at increments of pressure in said flare conduit; a first gas-liquid separator; conduit means connecting said first separator to said flare conduit at a point upstream from said liquid seals; a second gas-liquid separator; means to remove gas from said first separator, to compress and cool said gas and pass same to said second separator; means to recover liquid from said separators as said condensable constitutents; means to supply gas to said first separator, when the pressure in said flare conduit is below a predetermined minimum; and means to pass gas from said second separator to a fuel gas supply means when the pressure in said flare conduit is above said predetermined minimum.

References Cited in the file of this patent

UNITED STATES PATENTS

| | | |
|---|---|---|
| 2,734,562 | Haberle | Feb. 14, 1956 |
| 2,792,070 | Strunk | May 14, 1957 |
| 2,899,013 | Carter | Aug. 11, 1959 |